US012118477B2

United States Patent
Davies et al.

(10) Patent No.: US 12,118,477 B2
(45) Date of Patent: Oct. 15, 2024

(54) FACILITATING HYDROCARBON EXPLORATION FROM EARTH SYSTEM MODELS

(71) Applicant: Landmark Graphics Corporation, Houston, TX (US)

(72) Inventors: Andrew Davies, West Hagbourne (GB); Elizabeth Atar, Wetherby (GB); Masoud Ghaderi Zefreh, Edinburgh (GB); Graham Baines, Abingdon (GB); Benjamin Greselle, Didcot (GB)

(73) Assignee: Landmark Graphics Corporation, Houston, TX (US)

( * ) Notice: Subject to any disclaimer, the term of this patent is extended or adjusted under 35 U.S.C. 154(b) by 307 days.

(21) Appl. No.: 16/881,166

(22) Filed: May 22, 2020

(65) Prior Publication Data
US 2021/0365808 A1    Nov. 25, 2021

(51) Int. Cl.
*E21B 41/00*    (2006.01)
*G01V 20/00*    (2024.01)
(Continued)

(52) U.S. Cl.
CPC .............. *G06N 5/04* (2013.01); *E21B 41/00* (2013.01); *G01V 20/00* (2024.01); *G06N 20/00* (2019.01)

(58) Field of Classification Search
CPC .......... G06N 5/04; G06N 20/00; E21B 41/00; E21B 2200/22; G01V 99/005; G01V 20/00; G06F 30/20
See application file for complete search history.

(56) References Cited

U.S. PATENT DOCUMENTS

| 8,972,233 B2 | 3/2015 | Bohacs et al. |
| 2010/0175886 A1 * | 7/2010 | Bohacs ................. G06G 7/50 702/11 |

(Continued)

FOREIGN PATENT DOCUMENTS

| WO | 2009011737 | 1/2009 |
| WO | WO-2019017962 A1 * | 1/2019 ........... G01V 99/005 |

(Continued)

OTHER PUBLICATIONS

Taghizadeh-Mehrjardi et al. "Improving the Spatial Prediction of Soil Organic Carbon Content in Two Contrasting Climatic Regions by Stacking Machine Learning Models and Rescanning Covariate Space". Remote Sens. 2020, 12, 1095; doi:10.3390/rs12071095. Mar. 29, 2020. 26 Pages. (Year: 2020).*

(Continued)

*Primary Examiner* — Eunhee Kim
(74) *Attorney, Agent, or Firm* — Kilpatrick Townsend & Stockton LLP

(57) ABSTRACT

A system includes a processor and a memory. The memory includes instructions that are executable by the processor to access training data of a modern feature of interest from direct observations, remotely determined data, or a combination thereof. The instructions are also executable to compile parameter data from at least one model simulation that impacts the modern feature of interest. The instructions are executable to train a machine-learning model to generate a predictive model that matches the training data of the modern feature of interest using the compiled parameter data as input. Furthermore, the instructions are executable to predict a feature of interest in a past time period using the predictive model and at least one historical model simulation that impacts the feature of interest. Additionally, the instructions are executable to execute a processing operation for (Continued)

facilitating hydrocarbon exploration based on the predicted feature of interest from the predictive model.

20 Claims, 5 Drawing Sheets

(51) Int. Cl.
  *G06N 5/04* (2023.01)
  *G06N 20/00* (2019.01)

(56) References Cited

U.S. PATENT DOCUMENTS

| | | | |
|---|---|---|---|
| 2018/0267205 | A1 | 9/2018 | Harris et al. |
| 2018/0335538 | A1* | 11/2018 | Dupont .................. G06Q 10/04 |
| 2019/0080224 | A1* | 3/2019 | Madasu ................ G06N 3/0445 |
| 2020/0160173 | A1 | 5/2020 | Pandey et al. |
| 2020/0380390 | A1* | 12/2020 | Sun .......................... G06N 5/04 |
| 2021/0041596 | A1* | 2/2021 | Kushwaha ............. G01V 1/282 |
| 2021/0326721 | A1* | 10/2021 | Zhang .................... G06N 3/086 |

FOREIGN PATENT DOCUMENTS

| | | |
|---|---|---|
| WO | 2019216889 | 11/2019 |
| WO | 2019236078 | 12/2019 |

OTHER PUBLICATIONS

Bohacs, Kevin, and Carmen Fraticelli. "Paleo-environmental Reconstruction and Analysis (Paleogeography, Paleoclimate, Paleo-oceanography, Paleobiology) as part of Integrated Source Rock Prediction." Dec. 2008. 10 Pages. doi: https://doi.org/10.2523/IPTC-12257-MS (Year: 2008).*

Markwick, P. J. (2019). Palaeogeography in exploration. Geological Magazine, 156(2), 366. doi:https://doi.org/10.1017/S0016756818000468 (Year: 2019).*

Davies, Andrew. "Paleoclimate Models in Exploration." Neftex Explor. Insights (2020): pp. 24-pp. 30. (Year: 2020).*

Haywood, Alan M., Paul J. Valdes, Tracy Aze, Natasha Barlow, Ariane Burke, Aisling M. Dolan, A. S. Von Der Heydt et al. "What can Palaeoclimate Modelling do for you?." Earth Systems and Environment 3 (2019): 1-18. (Year: 2019).*

Reichstein et al., "Deep Learning and Process Understanding for Data-Driven Earth System Science", 2019, pp. 195-204.

Younjoo et al., "An Assessment of Phytoplankton Primary Productivity in the Arctic Ocean from Satellite Ocean Color/in Situ Chlorophyll-a Based Models", 2015, pp. 6508-6541.

Blix et al., "Machine Learning Automatic Model Selection Algorithm for Oceanic Chlorophyll-a Content Retrieval", Remote Sensing, vol. 10, No. 5, May 17, 2018, pp. 1-21.

Application No. PCT/US2020/034152, International Search Report and Written Opinion, Mailed On Feb. 5, 2021, 8 pages.

GB Application No. GB2105590.0, "Search Report", Oct. 15, 2021, 4 pages.

\* cited by examiner

FACILITATING HYDROCARBON EXPLORATION FROM EARTH SYSTEM MODELS

TECHNICAL FIELD

The present disclosure relates generally to hydrocarbon exploration. More specifically, but not by way of limitation, this disclosure relates to facilitating hydrocarbon exploration by predicting an occurrence of petroleum system elements using a machine-learning model applied to historical Earth system factor models.

BACKGROUND

Hydrocarbon exploration is the search for hydrocarbons (e.g., oil or gas) within a subterranean formation. Earth system factors, such as climate, oceanographic conditions, and hydrologic conditions, may influence deposition of petroleum system elements, such as hydrocarbon bearing source rock, within the subterranean formation. Consequently, paleoclimate models that simulate past climate, oceanographic conditions, and hydrologic conditions may be used to predict the occurrence of the petroleum system elements in the absence of other data. But the accuracy and repeatability of predictions of petroleum system elements using the paleoclimate models may be limited. Inaccurate predictions of such petroleum system elements can result in a poor success rate in future exploration wells.

DETAILED DESCRIPTION

Figure 1:
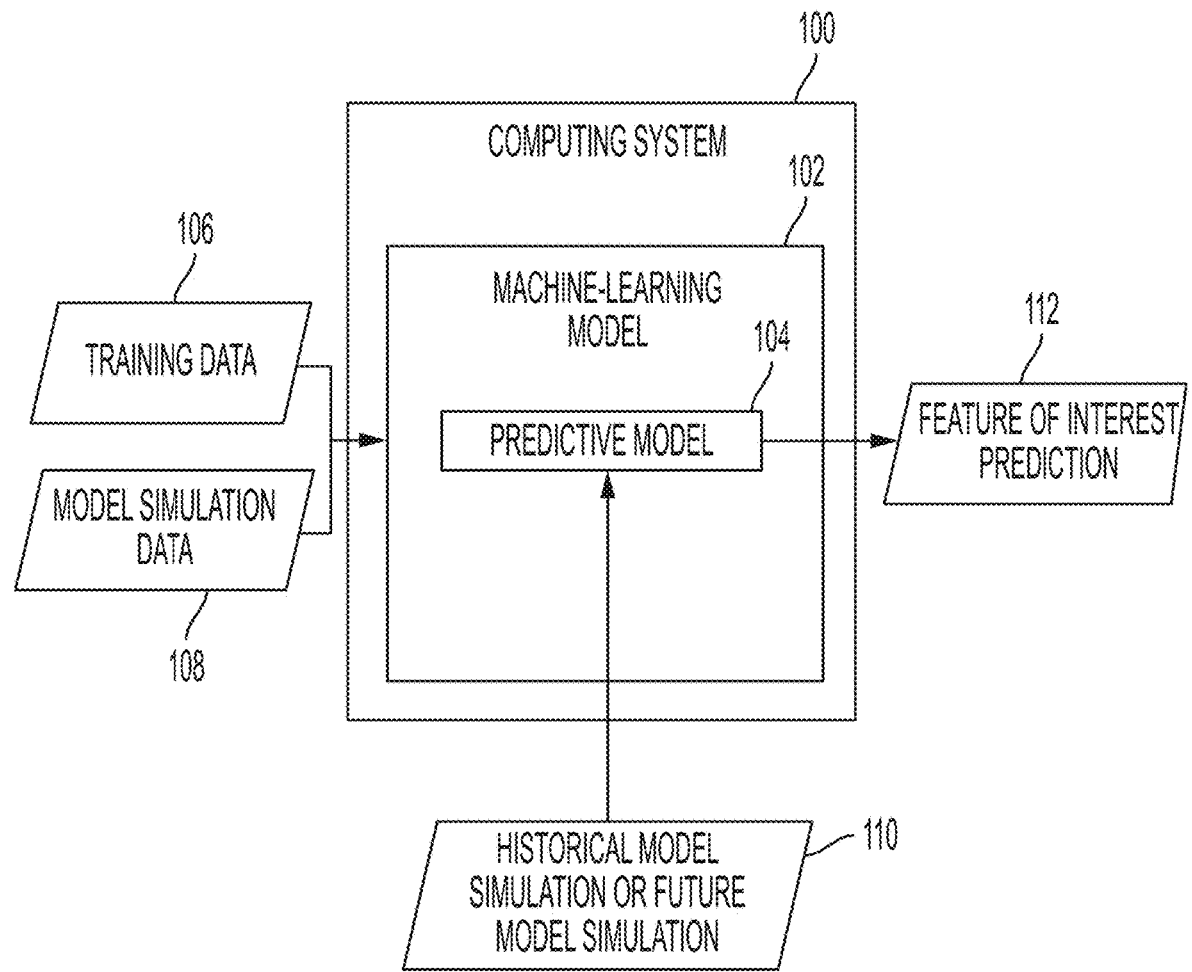
FIG. 1 depicts a computing environment including a computing system executing a machine-learning model according to some aspects of the present disclosure.

Certain aspects and features of the present disclosure relate to facilitating hydrocarbon exploration by predicting an occurrence of petroleum system elements using a trained machine-learning model applied to historical Earth system factor models. The petroleum system elements may be inferred from predicted features of interest output by the trained machine-learning algorithm. The features of interest may include a particular feature that is also observable in modern times and is known to have an effect on the historical generation of hydrocarbons within a formation. As one particular example, the feature of interest may include primary organic productivity, total organic carbon (TOC), and lithology that are all measurable or otherwise observable in a current time frame. Modern observations of these modern features of interest may include measurements of chlorophyll concentration in surface water or TOC concentration of sediments located on a seabed. As used herein, the term "historical" may refer to any time period that occurred prior to a present time period.

These modern observations of the modern features of interest may include labels (e.g., training data) that are used to condition a supervised machine-learning model. Other inputs to the supervised machine-learning model that are associated with the features of interest can include a range of factors on the Earth system, such as elevation models, geography, and results of computer simulations. The results of computer simulations may include historical or future predictions of climate, tide, sediment flux, or other Earth system simulations.

In an example, the supervised machine-learning model may be validated on modern data, such as the observable, modern features of interest. Once validated, the trained machine-learning model, or predictive model, may be applied to paleoclimate simulations to predict primary organic productivity back through geological time. In some instances, data from a geological record may be included as training data to improve performance of the predictive model. Accordingly, the predictive model may be customized based on available geological information. Additionally, the predictive model may be used to predict an impact of future climate change on factors such as fishing, food availability, or carbon burial.

In predicting historical primary organic productivity, or other features of interest, for particular areas or basins, the operator may receive an indication that particular areas or basins have been significantly impacted by particular features of interest. Because these features of interest are known to impact hydrocarbon generation within a geological formation, the areas or basins that are predicted to have been significantly impacted by the features of interest may indicate a high likelihood of the presence of hydrocarbons within the areas or basins. The operator may use this information for determining sites of future hydrocarbon exploration.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is an example of a computing environment including a computing system 100 executing a machine-learning model 102 according to one example of the present disclosure. The machine-learning model 102, such as an ensemble classifier, may be trained to generate a predictive model 104, which is a trained version of the machine-learning model 102. For example, training data 106 and model simulation data 108 may be provided to the machine-learning model 102 to train the machine-learning model 102 and generate the predictive model 104. In an example, the training data 106 may include information relating to a modern feature of interest. The training data 106 may be compiled from direct observations (e.g., direct measurements of chlorophyll in seawater or total organic carbon (TOC) of sediments located on a seabed), using remotely determined data (e.g., chlorophyll concentration in seawater as observed from satellites), or a combination of direct observations and remotely determined data. In an attempt to remove transient weather effects from the training data 106, an averaging of the direct observations, the remotely determined data, or both over a time period may be performed when compiling the training data 106. In an example, the training data may be sourced from the public domain, proprietary information, data licensed from a third party, or any other source of training data. Further, the training data may be stored on a local drive, a network drive, a cloud storage system, or any other storage medium.

In some examples, the training data 106 may also be modified such that the training data 106 only reflects natural data. That is, human influences on the direct observations and the remotely determined data may be removed. As an example, human activities may increase nutrient supply in oceans based on nutrient runoff originating from rivers. Thus, chlorophyll levels at mouths of rivers into oceans may be much larger than chlorophyll levels in the remainder of the oceans as a result of anthropogenic influences. The river systems that provide anthropogenically enhanced nutrient concentrations may be identified, and the effect of the enhanced nutrient concentrations on the training data 106 may be removed. This step may enable the predictive model 104 to ignore human influences that would not have been present in the time period that resulted in formation of hydrocarbons within a geological formation.

The model simulation data 108 may also be compiled and provided to or otherwise accessed by the machine-learning model 102. The model simulation data 108, which may also be referred to as parameter data, may include data from a hydrosphere model (e.g., sea temperature, current direction, current strength, tidal range, wave conditions, fluvial systems, etc.), an atmospheric model (e.g., wind speed, wind direction, etc.), a heliosphere model (e.g., incoming solar radiation), a geosphere model (e.g., bathymetry, distance from land, etc.), a cryosphere model (e.g., sea ice conditions, proximity to land ice sheets, etc.), a biosphere model (e.g., nature of vegetation in hinterland drainage basins), or any other models that may be relevant to features that influence creation of hydrocarbons within a geological formation. In some examples, the models mentioned above may be combined into general circulation or earth systems models. The general circulation or earth systems models may combine other models in a manner that links models that solve for feedback between and interdependencies of the combined models. These general circulation or earth systems models may also be used as the model simulation data 108. The model data provided to the machine-learning model 102 as the model simulation data 108 may, in some examples, be selected using domain expertise based on relevance of the models to a feature of interest.

In some examples, such as when the training data 106 is in a raster format, a resolution of all data input to the machine-learning model 102, such as the training data 106 and the model simulation data 108, is consistent with respect to data resolution. To achieve consistent resolution, a resampling of an oversampled data source may be implemented for consistency with a lower resolution data source. When data input to the machine-learning model 102 is in a point format, such as TOC observations at specific locations, features output by the machine-learning model 102 may be extracted for specific locations where the training data 106 is available.

Additionally, data from the geological record may be used as parameter data that is also used for training the machine-learning model 102. The data from the geological record may enable the machine-learning model 102 to learn a wider range of scenarios than those that occur in the modern world. For example, the geological record may provide information about additional details associated with a historical or pre-historical era that are not readily obtainable in modern times. For accuracy, the data from the geological record may be reconstructed to a paleo-position using a plate tectonic model, and the features of interest may be extracted from a co-incident paleo Earth systems model.

The machine-learning model 102 may be trained to generate a predictive model for a modern feature of interest. For example, the machine-learning model 102 may be trained to predict modern primary productivity, which may be represented by chlorophyll concentrations in seawater. The training of the machine-learning model 102 may use a portion of the training data 106. A remainder of the training data 106 may be used upon completion of the training as a test dataset that validates the predictive model 104 that is generated through training of the machine-learning model 102. Depending on an objective, a regression algorithm or a classification algorithm approach may be used for the machine-learning model 102. For example, when using a regression algorithm, the machine-learning model 102 may be trained to generate a predicted value of a feature of interest, such as a chlorophyll concentration value of a TOC value. When using a classification algorithm, the machine-learning model 102 may be trained to predict a feature of interest in different states or classes. For example, the different states or classes may be a high state indicating presence of source rock or a low stat indicating a lack of source rock. Further, the different states or classes may include different classes of lithology, such as sandstone, limestone, and shale. Additionally, the machine-learning model 102 may be trained using a variety of techniques, such as kernel analysis, support vector regression, kernel approximation, bootstrapping, ensemble methods, and neural networks, among others.

Once the predictive model 104 is generated through training of the machine-learning model 102, the predictive model 104 may be validated against the portion of the training data 106 held in reserve, as described above. Assuming sufficient performance of the predictive model 104, feature engineering of the predictive model 104 may be performed to further improve performance of the predictive model 104 by analyzing an effect and importance of each feature from a historical model simulation or a future model simulation 110 applied to the predictive model 104 to generate a feature of interest prediction 112. For example, the feature engineering may include the use of trial and error to identify non-relevant or problematic features that are provided as input to the predictive model 104. In another example, the feature engineering may include automated algorithms to discover importance of features that are provided as input to the predictive model 104 and to explore how different combinations of features affect the results of the predictive model 104.

Using mutual information regression, the computing system 100 may also test for dependencies between input features, such as the historical model simulations and future model simulations 110, and the feature of interest prediction 112 output from the predictive model 104. These input features may be ranked based on how important the input feature is to the feature of interest prediction 112. When attempting to optimize the predictive model 104 using feature engineering, the input features with the lowest ranking, such as those determined to have little or no impact on the feature of interest prediction 112, may be removed from the predictive model 104. In an example, removal of the input features may be performed automatically to validate the effect of removing each feature on the resulting predictive model 104. Differences may also be explored geographically to ensure that the predictive model 104 is optimized for an area of interest (e.g., global information versus regional information or coastal information versus ocean-wide information).

Upon completion of the feature engineering process, the predictive model 104 can be employed to predict future conditions or to retrodict past conditions. As used herein, the term "predict" may be used interchangeably with the term retrodict. For example, the predictive model 104 may predict both future conditions or past conditions. These predictions may be accomplished using various combinations of paleo-climate, paleo-tidal, paleo-wave, paleo-drainage, paleo-geography, paleo-elevation, and paleo-biosphere models, among others. When predicting the past conditions, geological datasets can be used to assess the performance of the predictive model 104. By assessing the performance of the predictive model 104, further feature engineering may be performed if the assessment indicates it would be beneficial. The resulting feature of interest predictions 112 generated by the predictive model 104 may be used to provide insights into modelling of past primary productivity to enhance predictions of source rock presence and quality. In another example, the feature of interest predictions 112 may be used to predict changes in fish stock due or other climatically relevant features to climate change predicted to occur in the future.

Figure 2:
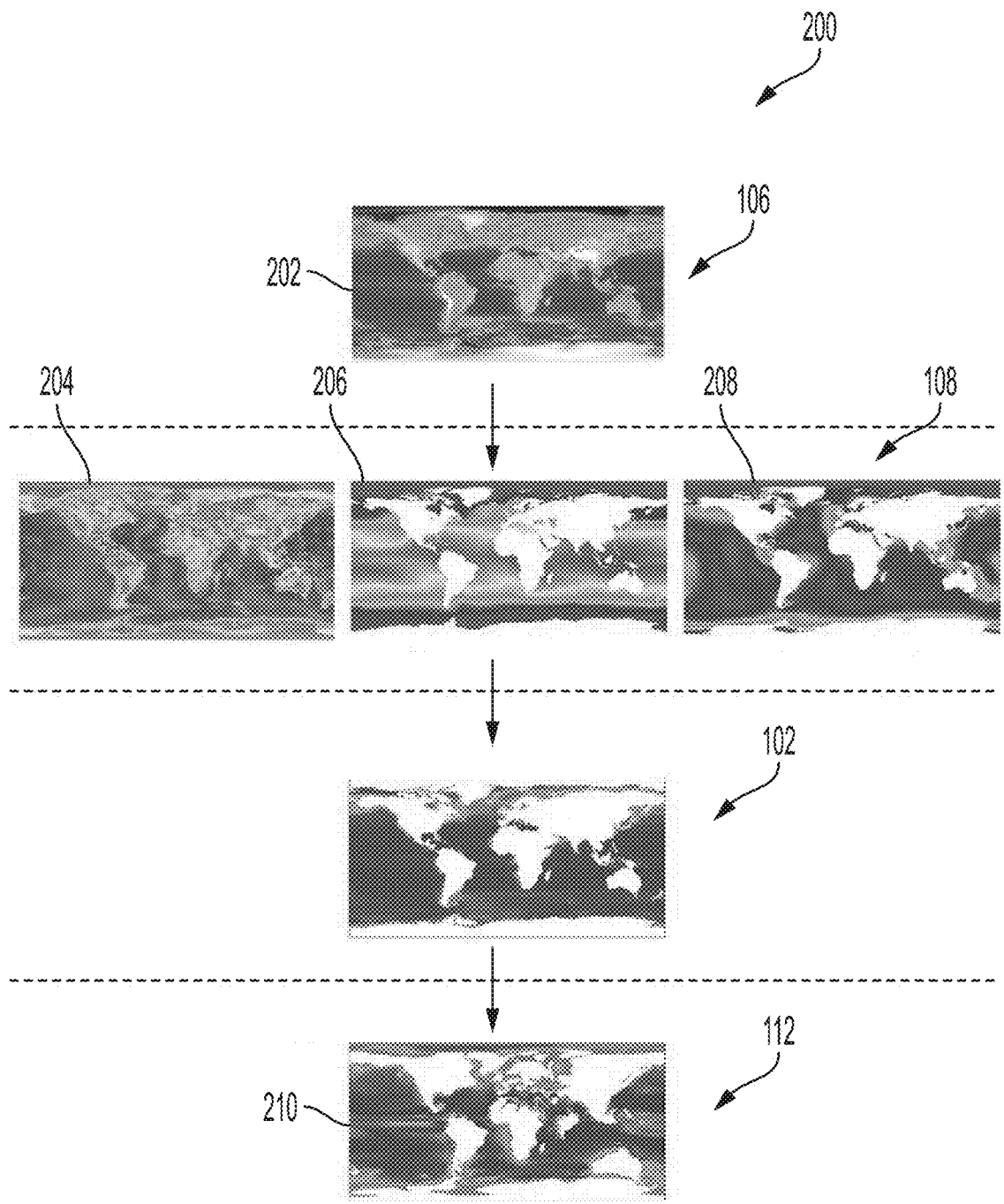
FIG. 2 depicts an example of a data progression of a predictive model according to some aspects of the present disclosure.

FIG. 2 is an example of a data progression 200 of the predictive model 104 according to one example of the present disclosure. As discussed above with respect to FIG. 1, the training data 106 and the model simulation data 108 may be provided to the machine-learning model 102 to generate the predictive model 104. The training data 106 may include a global magnitude map 202 representing chlorophyll concentrations in oceans. The chlorophyll concentrations may be collected from analyzing colors of scientific images, or the chlorophyll concentrations may be collected as a point format where chlorophyll concentrations are determined manually at various collection sites.

The model simulation data 108 may include a digital elevation model 204, an ocean and climate parameters model 206, a tidal parameters model 208, and other parameter models (e.g., continental runoff, wave regime, distance to land, solar irradiance, etc.). The model simulation data 108 may be modern parameters that model earth parameters. The modern parameters 108 are used to train the machine-learning model 102 in a supervised fashion using the training data 106. For example, the model simulation data 108 is used to train the machine-learning model 102 to generate an output that matches the training data 106.

The feature of interest prediction 112 may include a global magnitude map 210 representing chlorophyll concentrations during a period of interest. For example, paleo-elevation models, paleo-ocean and climate parameter models, paleo-tidal parameter models, and other paleo models may be provided to the predictive model 104 (i.e., the trained machine-learning model 102) to generate the feature of interest prediction 112. The generated feature of interest prediction 112 may represent the global chlorophyll concentrations at a particular time period that is associated with generation of a hydrocarbon bearing formation. The chlorophyll concentrations may also be predicted by the predictive model 104 at multiple time periods that are associated with the generation of hydrocarbon bearing formations. Other features of interest beyond chlorophyll concentration may also be predicted based on available training data 106. For example, total organic carbon (TOC) of seabed sediment may also be provided as the training data 106, and the predictive model 104 may output the global magnitude map 210 representing the TOC of seabed sediment at the time periods of interest. Additionally, future features of interest may also be predicted by the predictive model 104, such as impacts of future climate change on factors such as fishing, food availability, or carbon burial.

Figure 3:
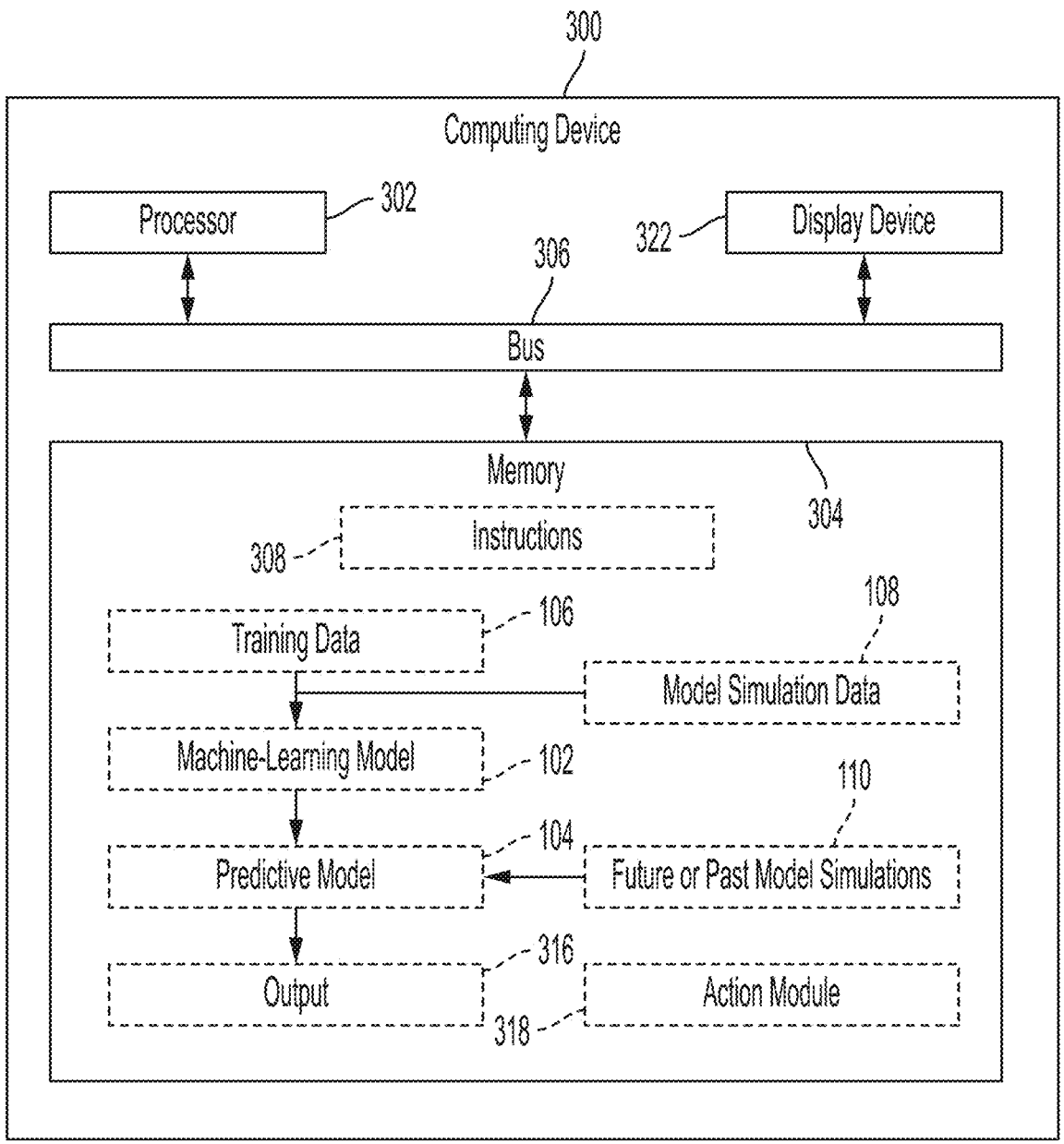
FIG. 3 is a block diagram of an example of a computing device according to some aspects of the present disclosure.

FIG. 3 is a block diagram of an example of a computing device 300 according to some aspects of the present disclosure. While FIG. 3 depicts the computing device 300 as including certain components, other examples may involve more, fewer, or different components than are shown in FIG. 3. In an example, the computing device 300 may be implemented as the computing system 100, as described above with respect to FIG. 1.

As shown, the computing device 300 includes a processor 302 communicatively coupled to a memory 304 by a bus 306. The processor 302 can include one processor or multiple processors. Non-limiting examples of the processor 302 include a Field-Programmable Gate Array (FPGA), an application-specific integrated circuit (ASIC), a microprocessor, or any combination of these. The processor 302 can execute instructions 308 stored in the memory 304 to perform operations. In some examples, the instructions 308 can include processor-specific instructions generated by a compiler or an interpreter from code written in any suitable computer-programming language, such as C, C++, C#, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device includes a non-transitory computer-readable medium from which the processor 302 can read instructions 308. A non-transitory computer-readable medium can include electronic, optical, magnetic, or other storage devices capable of providing the processor 302 with the instructions 308 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 308.

The computing device 300 may include the machine-learning model 102 that can receive the training data 106 and the model simulation data 108 for use in a supervised training process. For example, the machine-learning model 102 may be trained with the training data 106 and the model simulation data 108 to generate the predictive model 104. The computing device 300 can execute the predictive model 104 based on the future or past model simulations 110 to generate an output 316 indicating a feature of interest from a particular time period in the past or in the future. The output 316 can provide useful information to an operator as to whether the particular areas are suitable for hydrocarbon exploration. For example, a predicted feature of interest indicating that conditions were present during a specified time period that is conducive to hydrocarbon generation within a geological formation may result in the operator choosing to further explore particular regions for hydrocarbons. Notifying the operator of this information before further exploration operations can minimize the likelihood of inefficient exploration of basins not expected to have significant hydrocarbon deposits and inadvertent omission of exploration in basins that are predicted to have significant hydrocarbon deposits.

In some examples, the machine-learning model 102 can include a neural network, a support vector machine, a Bayesian classifier, an ensemble method, or any combination of these or other algorithms. The machine-learning model 102 may be in an untrained state. The machine-learning model 102 can be trained using the training data 106 and the model simulation data 108 to generate the predictive model 104.

The computing device 300 can also include an action module 318. The action module 318 can include executable program code for taking one or more actions based on the output 316 of the predictive model 104. For example, the computing device 300 can execute the action module 318 to determine whether an area is more suitable for hydrocarbon exploration than other similarly analyzed areas based on the output 316 from the predictive model 104. The computing device 300 can then generate a graphical user interface (GUI) indicating whether particular areas are suitable for further exploration and display the GUI on a display device 322, such as a liquid crystal display or light emitting diode display.

In some examples, the action module 318 can determine that a particular area is likely to be more favorable for exploration than another area based on an assigned feature of interest scores determined from the output 316 from the predictive model 104. For example, the action module 318 can apply a scoring-analysis algorithm to the output 316 to provide an indication of areas with greatest predicted feature of interest values. After scoring the areas, the computing device 300 can generate a graphical user interface (GUI) that identifies scored areas relative to one another, such as in a map depiction of geographical areas.

As one particular example, the computing device 300 uses the predictive model 104 to generate the output 316 indicating feature of interest predictions 112. The computing device 300 can then execute the action module 318 to apply a set of rules based on the output 316 to determine whether particular areas are suitable for hydrocarbon exploration. The rules may indicate that the particular areas are predicted to have source rock, which may be an indicator of the presence of hydrocarbons within a geological formation. The computing device 300 can generate and display a GUI that includes an alert indicating whether the particular areas are suitable for further exploration.

Figure 4A:
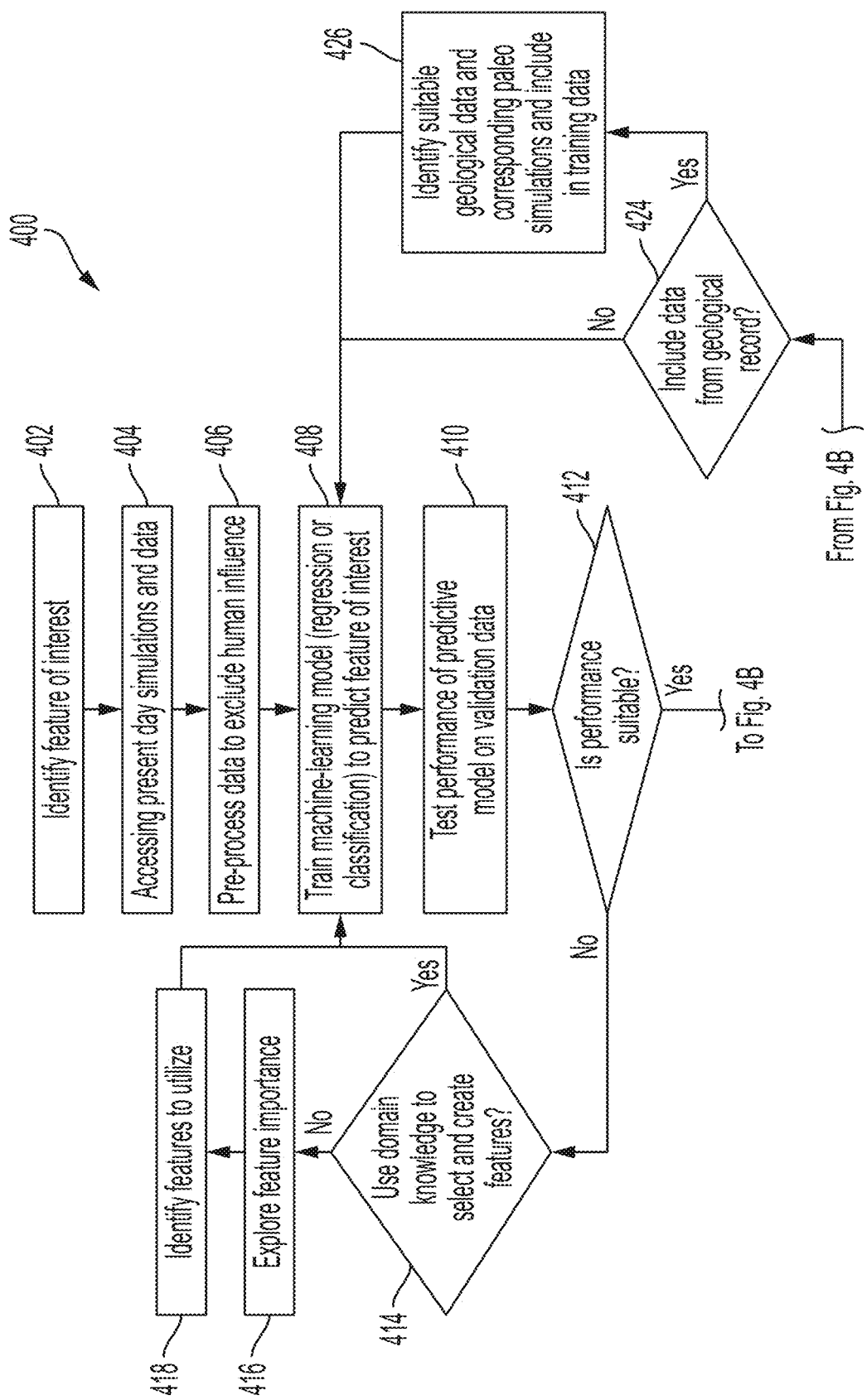
FIGS. 4A and 4B depict a flowchart of a process to train a machine-learning model and to implement a resulting predictive model according to some aspects of the present disclosure.
Figure 4B:
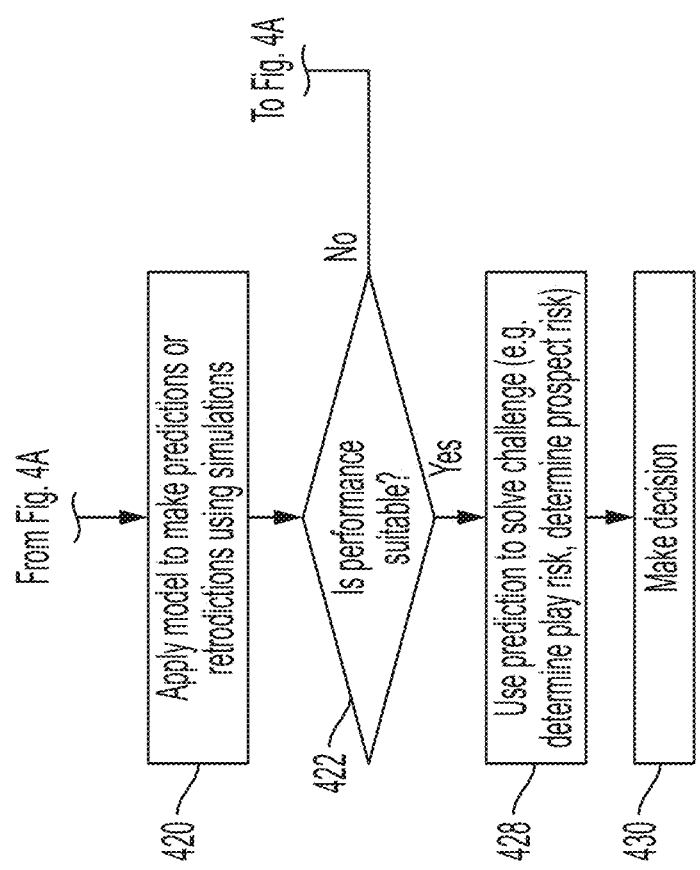

In some examples, the computing device 300 can implement the process 400 shown in FIGS. 4A and 4B for effectuating some aspects of the present disclosure. Other examples can involve more operations, fewer operations, different operations, or a different order of the operations shown in FIGS. 4A and 4B. The operations of FIGS. 4A and 4B are described below with reference to the components shown in FIG. 3.

In block 402, the processor 302 identifies a feature of interest. The feature of interest can include a total organic carbon (TOC) of sediment on a seabed or a concentration of chlorophyll within seawater. Other observable features of interest may also be identified for use in the process 400 such as source rock presence, carbonate types, lithology, a presence of evaporates, a presence of a desert, or any other features that may be climatically related.

In block 404, the processor 302 accesses present day simulations and data. The present day data may include the training data 106, and the present day simulations may include the model simulation data 108. The training data 106 and the model simulation data 108 may be used to train the machine-learning model 102 in a supervised manner.

In block 406, the processor 302 may pre-process the data, such as the training data 106, to exclude human influences or other aspects that might not be relevant to the geological past from the data. In some examples, pre-processing may occur on the data by providing the data to models that exclude certain natural features present today that were known to be absent at a specific time in the past. Because human influences would not be present in a time frame associated with generation of hydrocarbons in a geological formation, any human influences present in the training data 106 may introduce inaccuracies for predictions of the feature of interest in the time frame associated with the generation of hydrocarbons. In an example, excluding the human influence may include identifying river mouths that contribute to increased TOC in water from enhanced nutrients due to human influences, and removing sections of data associated with portions of the ocean that are influenced by those river mouths. Other techniques may also be used to exclude data associated with human influences.

In block 408, the processor 302 trains the machine-learning model 102 to generate the feature of interest prediction 112. The processor 302 can use a regression or classification algorithm to train the machine-learning model 102. Further, the training data 106 and the model simulation data 108 may be used to train the machine-learning model 102. For example, the model simulation data 108 may be applied to the machine-learning model 102, which is trained to generate an output that matches the training data 106.

In block 410, the processor 302 tests a performance of the predictive model 104, which is the trained machine-learning model 102, using validation data. The validation data may include portions of the model simulation data 108 and the training data 106 that were held in reserve during the training process. In an example, the predictive model 104 has not previously used the validation data prior to the validation process. That is, the validation data is unknown to the predictive model 104.

In block 412, a determination is made if the performance of the predictive model 104 is suitable. The output 316 can indicate a predicted presence of the feature of interest within a specified time frame. In an example, the output 316 from the predictive model 104 using a validation input may be compared to a validation output. In an example, the output 316 may be found suitable if it is within 5% of the validation output. Other thresholds for suitability may also be used in block 412.

If the performance of the predictive model 104 is not suitable, then in block 414 a determination is made about whether domain knowledge should be used to select and create features of the predictive model 104. That is, block 414 may involve a determination about whether feature engineering of the predictive model 104 should be implemented to enhance the operation of the predictive model 104.

If feature engineering has not been implemented, in block 416, an importance of particular features in the model simulation data 108 may be explored. Further, in block 418, an identification of which of the particular features in the model simulation data 108 to keep or discard for use in further training of the machine-learning model 102 may be determined in block 408. Further, if the feature engineering has been implemented, as determined in block 414, then the processor 302 retrains the machine-learning model in block 408 with additional training data 106 and model simulation data 108.

If, in block 412, a determination is made that performance of the predictive model 104 is suitable, then in block 420, the processor 302 applies the historical model simulation or the future model simulation 110 to the predictive model 104 to make predictions about the identified feature of interest. For example, the predictive model 104 may predict TOC in an area at particular time periods of interest using the historical model simulation or the future model simulation 110.

In block 424, a determination of whether the performance of the predictive model 104 is suitable by comparing against data from the geological record not used to train the machine-learning model 102 is made. If not, in block 424, a determination is made about whether to include additional data from the geological record as training data to assist in training the machine-learning model 102. In an example, the data from the geological record may enable the machine-learning model 102 to learn a wider range of scenarios than those that occur in the modern world. For example, the geological record may provide information about additional details associated with a historical or pre-historical era that are not readily obtainable in modern times. For accuracy, the geological record may be reconstructed to a paleo-position using a plate tectonic model, and the features of interest may be extracted from a co-incident paleo Earth systems model.

If data from the geological record is determined to be used, then, in block 426, suitable geological data and corresponding paleo simulations are identified and included as part of the training data 106. This additional training data 106 may be applied by the processor 302 in block 408 to update training of the machine-learning model 102. If data from the geological record is determined to not be used, then, in block 408, training of the machine-learning model 102 may be updated using additional feature engineering or training data that is not associated with the geological data. In some embodiments, the geological data can be company proprietary data that are uploaded and included within the training data 106 via the cloud.

If in block 422, it is determined that the performance of the predictive model 104 is suitable, then, in block 428, the processor 302 uses the feature of interest prediction 112 to solve a challenge. In an example the challenge may include a determination of play risk or a determination of prospect risk. For example, the feature of interest prediction 112 may provide information that is used to predict a likelihood of the presence of hydrocarbons within a geological formation. The prediction of the likelihood of the presence of hydrocarbons may be used to quantify the risk of hydrocarbon exploration in particular areas. Thus, in block 430, a decision may be made based on the prediction about the potential results of hydrocarbon exploration in various areas.

In some examples, the one or more processing operations can facilitate further hydrocarbon exploration of a designated area by determining whether the designated area is suitable for exploration or more suitable for exploration than other areas based on the output 316 from the predictive model 104. The computing device 300 can then generate a graphical user interface (GUI) indicating whether the target area is suitable for further exploration and display the GUI on the display device 322, such as a liquid crystal display or light emitting diode display.

Hydrocarbon exploration using a predictive model can be facilitated according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory including instructions that are executable by the processor for causing the processor to: access training data of a modern feature of interest from direct observations, remotely determined data, or a combination thereof; compile parameter data from at least one model simulation that impacts the modern feature of interest; train a machine-learning model to generate a predictive model by training the machine-learning model to generate a predictive output that matches the training data of the modern feature of interest using the compiled parameter data as input; predict a feature of interest in a past time period using the predictive model and at least one historical model simulation that impacts the feature of interest; and execute one or more processing operations for facilitating hydrocarbon exploration based on the predicted feature of interest from the predictive model.

Example 2 is the system of example 1, wherein the modern feature of interest comprises a measurement of observable chlorophyll concentrations in seawater, a measurement of observable total organic carbon in sediments, or a combination thereof.

Example 3 is the system of examples 1-2, wherein the instructions are further executable by the processor for causing the processor to: remove anthropogenic influences from the training data.

Example 4 is the system of examples 1-3, wherein the at least one model simulation comprises a hydrosphere model, an atmospheric model, a heliosphere model, a geosphere model, a cryosphere model, a biosphere model, a general circulation model, an earth system model, or a combination thereof.

Example 5 is the system of examples 1-4, wherein resolutions of the training data and the parameter data are consistent with one another.

Example 6 is the system of examples 1-5, wherein the instructions are further executable by the processor for causing the processor to: optimize the predictive model by identifying and removing a portion of the parameter data from the at least one model simulation that has a limited or detrimental impact on predicting the feature of interest.

Example 7 is the system of examples 1-6, wherein executing one or more processing operations for facilitating hydrocarbon exploration based on the predicted feature of interest from the predictive model comprises: identifying a historical chlorophyll concentration of seawater, a historical total organic carbon measurement in sediments, or a combination thereof during a time period of interest; and identifying a location of modern hydrocarbon source rock using the historical chlorophyll concentration of seawater, the historical total organic carbon measurement in sediments, or the combination thereof during the time period of interest.

Example 8 is the system of examples 1-7, wherein the parameter data further comprises data from a geological record.

Example 9 is the system of examples 1-8, wherein the machine-learning model is trained using a classification algorithm or a regression algorithm.

Example 10 is a method comprising: accessing, by a processor, training data of a modern feature of interest from direct observations, remotely determined data, or a combination thereof; compiling, by the processor, parameter data from at least one model simulation that impacts the modern feature of interest; training, by the processor, a machine-learning model to generate a predictive model by training the machine-learning model to generate a predictive output that matches the training data of the modern feature of interest using the compiled parameter data as input; and predicting a feature of interest in a past time period or a future time period using the predictive model and at least one historical model simulation that impacts the feature of interest.

Example 11 is the method of example 10, further comprising: executing, by the processor, one or more processing operations for facilitating hydrocarbon exploration based on the predicted feature of interest from the predictive model.

Example 12 is the method of example 11, wherein executing one or more processing operations for facilitating hydrocarbon exploration based on the predicted feature of interest from the predictive model comprises: identifying a historical chlorophyll concentration of seawater, a historical total organic carbon measurement in sediments, or a combination thereof during a time period of interest; and identifying a location of modern hydrocarbon source rock using the historical chlorophyll concentration of seawater, the historical total organic carbon measurement in sediments, or the combination thereof during the time period of interest.

Example 13 is the method of examples 10-12, wherein the at least one model simulation comprises a hydrosphere model, an atmospheric model, a heliosphere model, a geosphere model, a cryosphere model, a biosphere model, a general circulation model, an earth system model, or a combination thereof.

Example 14 is the method of examples 10-13, further comprising: optimizing, by the processor, the predictive model by identifying and removing a portion of the parameter data from the at least one model simulation that has a limited or detrimental impact on predicting the feature of interest.

Example 15 is the method of examples 10-14, wherein the machine-learning model is trained using a classification algorithm or a regression algorithm.

Example 16 is a non-transitory computer-readable medium comprising program code that is executable by a processor for causing the processor to: access training data of a modern feature of interest from direct observations, remotely determined data, or a combination thereof; compile parameter data from at least one model simulation that impacts the modern feature of interest; train a machine-learning model to generate a predictive model by training the machine-learning model to generate a predictive output that matches the training data of the modern feature of interest using the compiled parameter data as input; and predict a feature of interest in a past time period or a future time period using the predictive model and at least one historical model simulation that impacts the feature of interest.

Example 17 is the non-transitory computer-readable medium of example 16, wherein the program code is further executable by the processor for causing the processor to: execute one or more processing operations for facilitating hydrocarbon exploration based on the predicted feature of interest from the predictive model.

Example 18 is the non-transitory computer-readable medium of examples 16-17, wherein the modern feature of interest comprises a measurement of observable chlorophyll concentrations in seawater, a measurement of observable total organic carbon in sediments, or a combination thereof.

Example 19 is the non-transitory computer-readable medium of examples 16-18, wherein the program code is further executable by the processor for causing the processor to: remove anthropogenic influences from the training data.

Example 20 is the non-transitory computer-readable medium of examples 16-19, wherein the parameter data further comprises data from a geological record.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
access training data including information relating to a modern feature of interest, the training data compiled from direct observations, remotely determined data, or a combination thereof, and including a global magnitude map representing the information relating to the modern feature of interest;
compile parameter data from at least one modern model simulation that impacts the modern feature of interest, the modern model simulation comprising a hydrosphere model, an atmospheric model, a heliosphere model, a geosphere model, a cryosphere model, a biosphere model, a general circulation model, an earth system model, or a combination thereof;
provide the training data and the compiled parameter data from the at least one modern model simulation to a machine-learning model;
generate a predictive model from the machine-learning model by training the machine-learning model on the training data and the compiled parameter data from the at least one modern model simulation;
output, by the predictive model, a predicted feature of interest in a past time period by applying the predictive model to compiled parameter data from at least one existing historical earth system factor model simulation that impacts the feature of interest in the past time period, wherein the predicted feature of interest includes a global magnitude map;
based on the predicted feature of interest in the past time period output by the predictive model, calculate a feature of interest score for each of a plurality of geographic areas of interest;
determine a suitability for exploration of at least one of the plurality of geographic areas of interest based on the feature of interest scores; and
indicate the suitability for exploration of the at least one of the plurality of geographic areas of interest relative to at least another one of the plurality of geographic areas of interest.

2. The system of claim 1, wherein the modern feature of interest comprises a measurement of observable chlorophyll concentrations in seawater, a measurement of observable total organic carbon in sediments, or a combination thereof.

3. The system of claim 1, wherein the instructions are further executable by the processor for causing the processor to:
remove anthropogenic influences from the training data.

4. The system of claim 1, wherein an output of the at least one existing historical earth system factor model simulation comprises historical predictions of climate, tide, sediment flux, or other earth system conditions.

5. The system of claim 1, wherein resolutions of the training data and the compiled parameter data from at least one modern model simulation are consistent with one another.

6. The system of claim 1, wherein the instructions are further executable by the processor for causing the processor to:
optimize the predictive model by identifying and removing a portion of the compiled parameter data from the at least one historical model simulation that has a limited or detrimental impact on predicting the feature of interest.

7. The system of claim 1, wherein determining the suitability for exploration of the at least one of the plurality of geographic areas of interest comprises:
identifying a historical chlorophyll concentration of seawater, a historical total organic carbon measurement in sediments, or a combination thereof during a time period of interest; and
identifying a location of modern hydrocarbon source rock using the historical chlorophyll concentration of seawater, the historical total organic carbon measurement in sediments, or the combination thereof during the time period of interest.

8. The system of claim 1, wherein the training data further comprises data from a geological record.

9. The system of claim 1, wherein the machine-learning model is trained using a classification algorithm or a regression algorithm.

10. A method comprising:
accessing, by a processor, training data including information relating to a modern feature of interest, the training data compiled from direct observations, remotely determined data, or a combination thereof, and including a global magnitude map representing the information relating to the modern feature of interest;
compiling, by the processor, parameter data from at least one modern model simulation that impacts the modern feature of interest, the modern model simulation comprising a hydrosphere model, an atmospheric model, a heliosphere model, a geosphere model, a cryosphere model, a biosphere model, a general circulation model, an earth system model, or a combination thereof;
providing the training data and the compiled parameter data from the at least one modern model simulation to a machine-learning model;
generating, by the processor, a predictive model from the machine-learning model by training the machine-learning model on the training data and the compiled parameter data from the at least one modern model simulation;
outputting, by the predictive model, a predicted feature of interest in a past time period by applying the predictive model to compiled parameter data from at least one existing historical earth system factor model simulation that impacts the feature of interest in the past time period, wherein the predicted feature of interest includes a global magnitude map;
based on the predicted feature of interest in the past time period output by the predictive model, calculating a feature of interest score for each of a plurality of geographic areas of interest;
determining a suitability for exploration of at least one of the plurality of geographic areas of interest based on the feature of interest scores; and
indicating the suitability for exploration of the at least one of the plurality of geographic areas of interest relative to at least another one of the plurality of geographic areas of interest.

11. The method of claim 10, further comprising:
executing, by the processor, one or more processing operations for facilitating hydrocarbon exploration in a given one of the plurality of geographic areas of interest based on the feature of interest score for the given one of the plurality of geographic areas of interest.

12. The method of claim 11, wherein executing the one or more processing operations for facilitating hydrocarbon exploration in a given one of the plurality of geographic areas of interest based on the feature of interest score for the given one of the plurality of geographic areas of interest comprises:
identifying a historical chlorophyll concentration of seawater, a historical total organic carbon measurement in sediments, or a combination thereof during a time period of interest; and
identifying a location of modern hydrocarbon source rock using the historical chlorophyll concentration of seawater, the historical total organic carbon measurement in sediments, or the combination thereof during the time period of interest.

13. The method of claim 10, wherein an output of the at least one existing historical earth system factor model simulation comprises historical predictions of climate, tide, sediment flux, or other earth system conditions.

14. The method of claim 10, further comprising:
optimizing, by the processor, the predictive model by identifying and removing a portion of the compiled parameter data from the at least one historical model simulation that has a limited or detrimental impact on predicting the feature of interest.

15. The method of claim 10, wherein the machine-learning model is trained using a classification algorithm or a regression algorithm.

16. A non-transitory computer-readable medium comprising program code that is executable by a processor for causing the processor to:
access training data including information relating to a modern feature of interest, the training data compiled from direct observations, remotely determined data, or a combination thereof, and including a global magnitude map representing the information relating to the modern feature of interest;
compile parameter data from at least one modern model simulation that impacts the modern feature of interest, the modern model simulation comprising a hydrosphere model, an atmospheric model, a heliosphere model, a geosphere model, a cryosphere model, a biosphere model, a general circulation model, an earth system model, or a combination thereof;
generate a predictive model from a machine-learning model by training the machine-learning model on the training data and the compiled parameter data from the at least one modern model simulation;
output, by the predictive model, a predicted feature of interest in a past time period by applying the predictive model to compiled parameter data from at least one existing historical earth system factor model simulation that impacts the feature of interest in the past time period, wherein the predicted feature of interest includes a global magnitude map;

based on the predicted feature of interest in the past time period output by the predictive model, calculate a feature of interest score for each of a plurality of geographic areas of interest;

determine a suitability for exploration of at least one of the plurality of geographic areas of interest based on the feature of interest scores; and indicate the suitability for exploration of the at least one of the plurality of geographic areas of interest relative to at least another one of the plurality of geographic areas of interest.

17. The non-transitory computer-readable medium of claim 16, wherein the program code is further executable by the processor for causing the processor to:

execute one or more processing operations for facilitating hydrocarbon exploration in a given one of the plurality of geographic areas of interest based on the feature of interest score for the given one of the plurality of geographic areas of interest.

18. The non-transitory computer-readable medium of claim 16, wherein the modern feature of interest comprises a measurement of observable chlorophyll concentrations in seawater, a measurement of observable total organic carbon in sediments, or a combination thereof.

19. The non-transitory computer-readable medium of claim 16, wherein the program code is further executable by the processor for causing the processor to:

remove anthropogenic influences from the training data.

20. The non-transitory computer-readable medium of claim 16, wherein the training data further comprises data from a geological record.

\* \* \* \* \*